US007984741B2

(12) United States Patent
Schaefer et al.

(10) Patent No.: US 7,984,741 B2
(45) Date of Patent: Jul. 26, 2011

(54) HIGH RELEASE NIP ROLL ASSEMBLY

(75) Inventors: Suzanne E. Schaefer, Appleton, WI (US); Kevin J. Curie, Appleton, WI (US); James Martin Deaton, III, Canton, NC (US); Jeremy Lee Winsor, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 552 days.

(21) Appl. No.: 11/958,736

(22) Filed: Dec. 18, 2007

(65) Prior Publication Data

US 2008/0156443 A1 Jul. 3, 2008

Related U.S. Application Data

(60) Provisional application No. 60/870,542, filed on Dec. 18, 2006.

(51) Int. Cl.
*B32B 37/00* (2006.01)
(52) U.S. Cl. ...... 156/555; 156/537; 156/582; 156/583.5
(58) Field of Classification Search .................. 156/446, 156/502, 537, 538, 555, 580, 582, 583.1, 156/583.5
See application file for complete search history.

(56) References Cited

U.S. PATENT DOCUMENTS

| 4,226,382 | A | * | 10/1980 | Watanabe | .................. | 242/586.2 |
| 5,935,378 | A |   | 8/1999  | Wolki et al. | | |
| 6,217,809 | B1 |  | 4/2001  | Defabritis | | |

FOREIGN PATENT DOCUMENTS

| CA | 2235903 | | 11/1998 |
| EP | 0875298 | A | 11/1998 |
| EP | 0875298 | B1 | 7/2001 |
| GB | 665 891 | A | 1/1952 |
| GB | 819 606 | A | 9/1959 |
| GB | 2028766 | A | 3/1980 |
| GB | 2256181 | A | 12/1992 |
| JP | 10217348 | A | 8/1998 |

OTHER PUBLICATIONS

Partial International Search Report for PCT/US2007/087908, dated May 27, 2008, pp. 1-2.
International Search Report for PCT/US2007/087908, dated Oct. 22, 2008, pp. 1-7.

* cited by examiner

*Primary Examiner* — James Sells
(74) *Attorney, Agent, or Firm* — Bemis Company, Inc.; Christine E. Parsons

(57) ABSTRACT

Disclosed herein is a high release nip roll assembly comprising a nip roll with a covering comprising a high release material. The release properties of the nip roll material can permit intermittent contact without the coating adhering to the surface of the roller and wrapping the nip. Also disclosed is a high release nip roll belt is made of a high release material on the top and bottom surfaces of the belt. The belt can be positioned at each end of a nip roll so that areas of the nip roll typically vulnerable to molten thermoplastic material contact are protected by a belt. Also disclosed is a belt making apparatus. Also disclosed is a frame assembly for moving a belt longitudinally along a nip roll. Also disclosed is a rope guide assembly for threading a belt in relation to a nip roll and at least at least one belt roller.

14 Claims, 9 Drawing Sheets

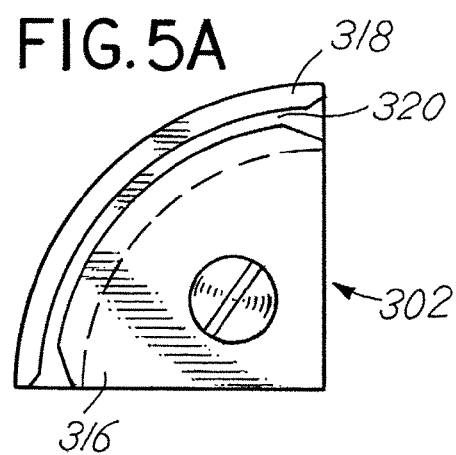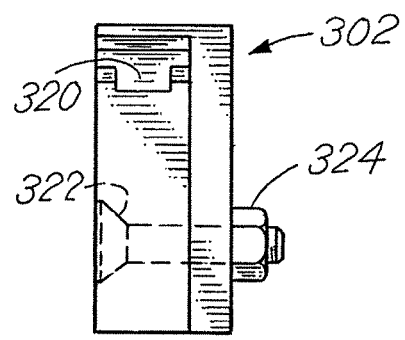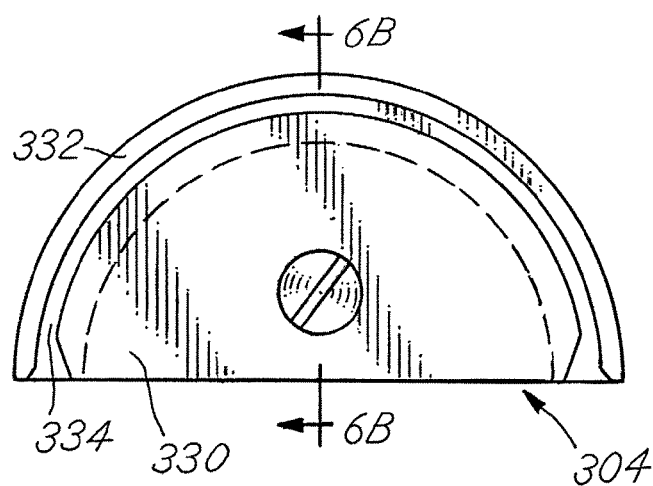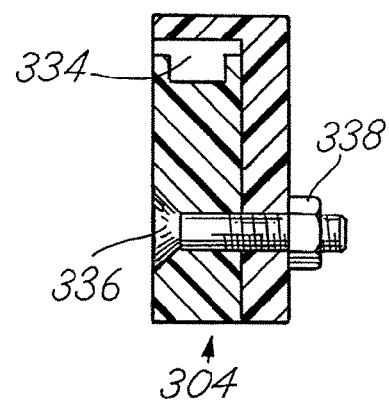

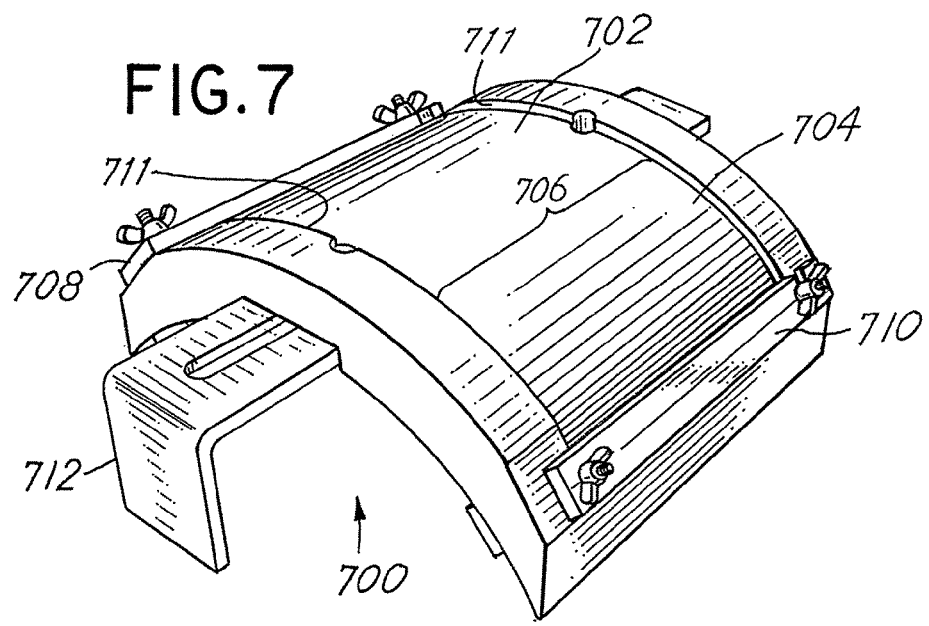
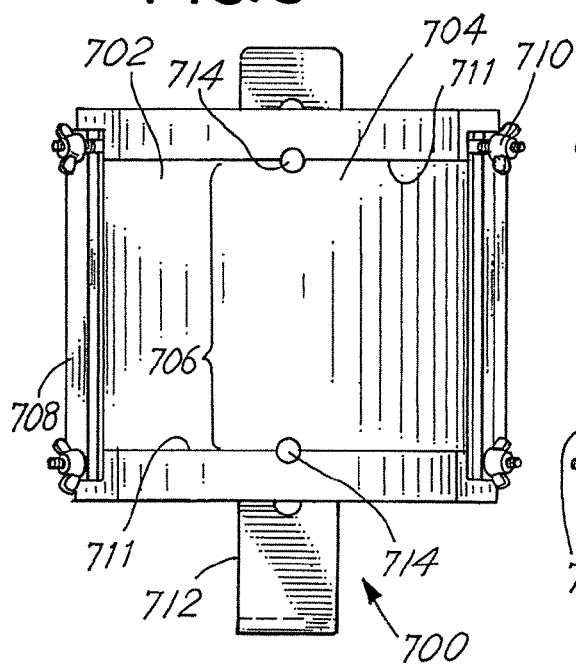 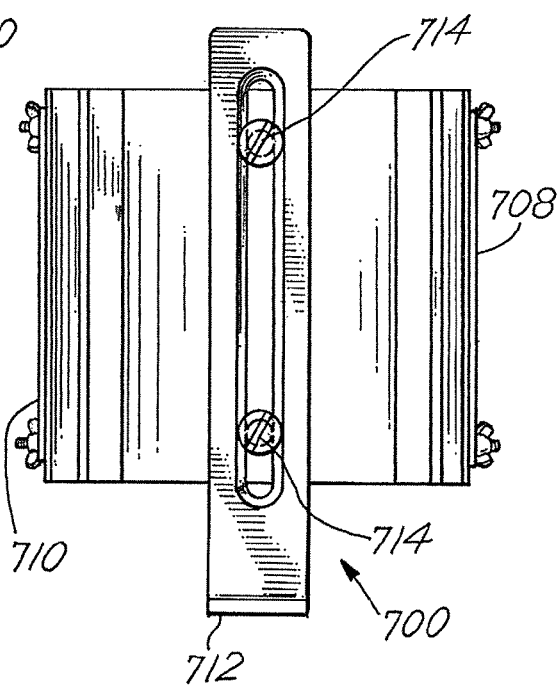

HIGH RELEASE NIP ROLL ASSEMBLY

CROSS REFERENCE TO RELATED APPLICATIONS

This application claims priority to provisional U.S. Application Ser. No. 60/870,542, filed Dec. 18, 2006, the disclosure of which is herein incorporated by reference in its entirety.

FIELD OF THE INVENTION

This disclosure relates to a high release nip roll release system in the manufacture of multilayer sheets, including but not limited to laminated-sheets.

BACKGROUND OF THE INVENTION

Extrusion laminating or coating lines are used to combine an extrudate or coating layer with a material or substrate layer that is being laminated or coated. Conventional extrusion laminating/coating lines use a nip roll or roller that is made from a thermally stable covering in combination with a chilled roll or roller. The extrudate is combined with the substrate that is being coated in the nip area between the nip roll and the chilled roll. In an extrusion process, an extrudate layer is fed on the chilled roll side of the nip area, and the substrate is fed on the nip roll side of the nip area. In a lamination process, a primary layer is fed on the nip roll side of the nip area, a secondary layer is fed on the chilled roll side of the nip area, and the extrudate is fed between the primary and secondary layers. See e.g., U.S. Pat. No. 3,526,000.

Conventional extrusion/coating lines use a nip roll having a thermally stable covering. Typical thermal stable covering used in conventional systems are rubber or rubber like coverings, e.g. synthetic rubbers based on polychloroprene (polymer form of chloroprene), such as Neoprene® by DuPont Performance Elastomers, or synthetic rubbers based on chlorosulfonated polyethylene (CSPE), such as Hypalon® by DuPont Performance Elastomers. The extrudate is typically a thermoplastic material, such as a polymer, e.g. polyethylene, ethylene vinyl acetate (EVA), etc. The thermoplastic material is typically molten when it comes into contact with the substrate in the nip area. If the molten thermoplastic material contacts the roller covering, such as an edge bead, the thermoplastic material will adhere to the roller covering and wrap, thereby causing the production line to stop. To prevent this from occurring, the traditional practice is to apply a Teflon® impregnated tape to the nip roll in the area where the edge bead contacts the roll covering. Conventional tape has an adhesive side opposite the Teflon® impregnated side of the tape, and it is the adhesive side that is applied to the nip roll. This practice works temporarily, but when the release properties of the tape are no longer sufficient or the tape has burned through due to the heat of the thermoplastic material, the hot material will adhere to the roller covering causing a nip wrap that requires the line to shutdown. Also, whenever the width being run changes, the tape position needs to be changed, thereby requiring the line to be shutdown so that the tape can be removed and new tape applied to the surface of the nip roll. Conventional Teflon®/adhesive tape systems are time consuming to apply, expensive and not very durable.

Another conventional approach to reduce nip wraps is to apply a Teflon®-sleeve around the entire nip roll. Teflon®-sleeved rollers, however, are costly and are very susceptible to damage due to their lack of resiliency and durability.

Another conventional approach to reduce nip wraps is to use a pre-assembled Teflon® belt having a cloth backing. Conventional pre-assembled Teflon®/cloth backing belt systems are time consuming to apply, expensive and not very durable. These conventional pre-assembled belt systems require machine disassembly for installing the pre-assembled belt on the nip roll of an extrusion laminator. Also, the thickness of the belt, due to the cloth backing, can cause grooves to be worn into the surface of the nip roll. If the position of the tape is incorrect and the extrudate contacts the nip roll, then a nip wrap can result.

All three of the approaches described above fail to provide a cost effective approach as the downtime associated with nip wraps remains significant.

BRIEF SUMMARY OF THE INVENTION

Disclosed herein is a high release nip roll assembly that provides edge bead release and reduces nip wraps. The disclosed high release nip roll assembly can be used in place of conventional approaches.

In one aspect, a high release belt is provided, which comprises a combination of two tapes, each tape having a high release side, and an adhesive side. The belt is formed by having the adhesive side of each tape joined to the adhesive side of the other tape, with the side edges of the tapes aligned so that top and bottom surfaces of the belt comprise a high release side of one of the joined tapes.

In one aspect, an apparatus comprises a nip roll assembly comprising a nip roll having a cover comprising a high release material, and the high release belt described above. A portion of the belt can be positioned on the nip roll to protect the nip roll at a location that otherwise would be vulnerable to molten thermoplastic material.

In one aspect, a high release belt making apparatus comprises a wind-up drum, a first tape roll having a high release side and an adhesive side, and a second tape roll having a high release side and an adhesive side, the wind-up drum defining a slot, the wind-up drum comprising a first clamp and a second clamp inside the wind-up drum, wherein a tape from the first tape roll can be fed into the slot and clamped by the first clamp, and a tape from the second tape roll can be fed into the slot and clamped by the second clamp, wherein the wind-up drum can be rotated and the adhesive side of the first tape adheres to the adhesive side of the second tape as the tapes are wound around the outside of the wind-up drum to produce a high release belt having a high release surface on each side of the belt.

In one aspect, an apparatus comprises at least one belt roller, the belt roller having an axis, and a support frame having a fixed portion and a moveable portion, the fixed portion comprising a fixed support bar having a section that is parallel to the axis of the belt roller and upon which the moveable portion can move along, the belt roller attached to the moveable portion of the support frame.

In one aspect, an apparatus comprises a rope guide system having a least one rope guide for guiding a rope in a path in relation to a nip roll and at least one belt roller, wherein the rope can be attached to a leading section of a belt. The rope can be pulled around at least one guide so that the rope pulls the belt in a predetermined path around at least one belt roller. The rope can then be detached from the leading section of the belt, and the leading section of the belt can be joined to the trailing section of the belt.

In one aspect, an apparatus comprises a jig, the jig comprising a curved arc top surface, the curved arc top surface defining a channel having a predetermined belt width, a leading section belt clip on one side of the curved arc top surface, and a trailing section belt clip on the other side of the curved arc top surface. The leading section of a belt can be clipped to the jig by the leading section belt clip, and laid within the channel. The trailing section of the belt can be clipped to the jig by the trailing section belt clip. An adhesive side portion of a bottom tape of the leading section of the belt can be exposed, an adhesive side portion of the top tape of the trailing section of the belt can be exposed, and respective adhesive side portions can be aligned within the channel and adhered to each other.

BRIEF DESCRIPTION OF THE DRAWINGS

Non-limiting embodiments will now be described with reference to the accompanying drawings.

FIG. 3A illustrates the taping of a rope to the leading section of belt shown in FIG. 3.

FIG. 5A illustrates a second embodiment of a rope guide in accordance with an aspect disclosed herein.

FIG. 5B illustrates a side view of the embodiment of the rope guide shown in FIG. 5A.

FIG. 6A illustrates an embodiment of a rope guide in accordance with an aspect disclosed herein.

FIG. 6B illustrates a sectional view of the rope guide shown in FIG. 6A taken along line 6B-6B.

FIG. 7 illustrates a perspective view of jig in accordance with an aspect disclosed herein.

FIG. 8 illustrates a top view of the jig shown in FIG. 7.

FIG. 9 illustrates a bottom view of the jig shown in FIG. 7.

DETAILED DESCRIPTION OF EMBODIMENTS OF THE INVENTION

Figure 1:
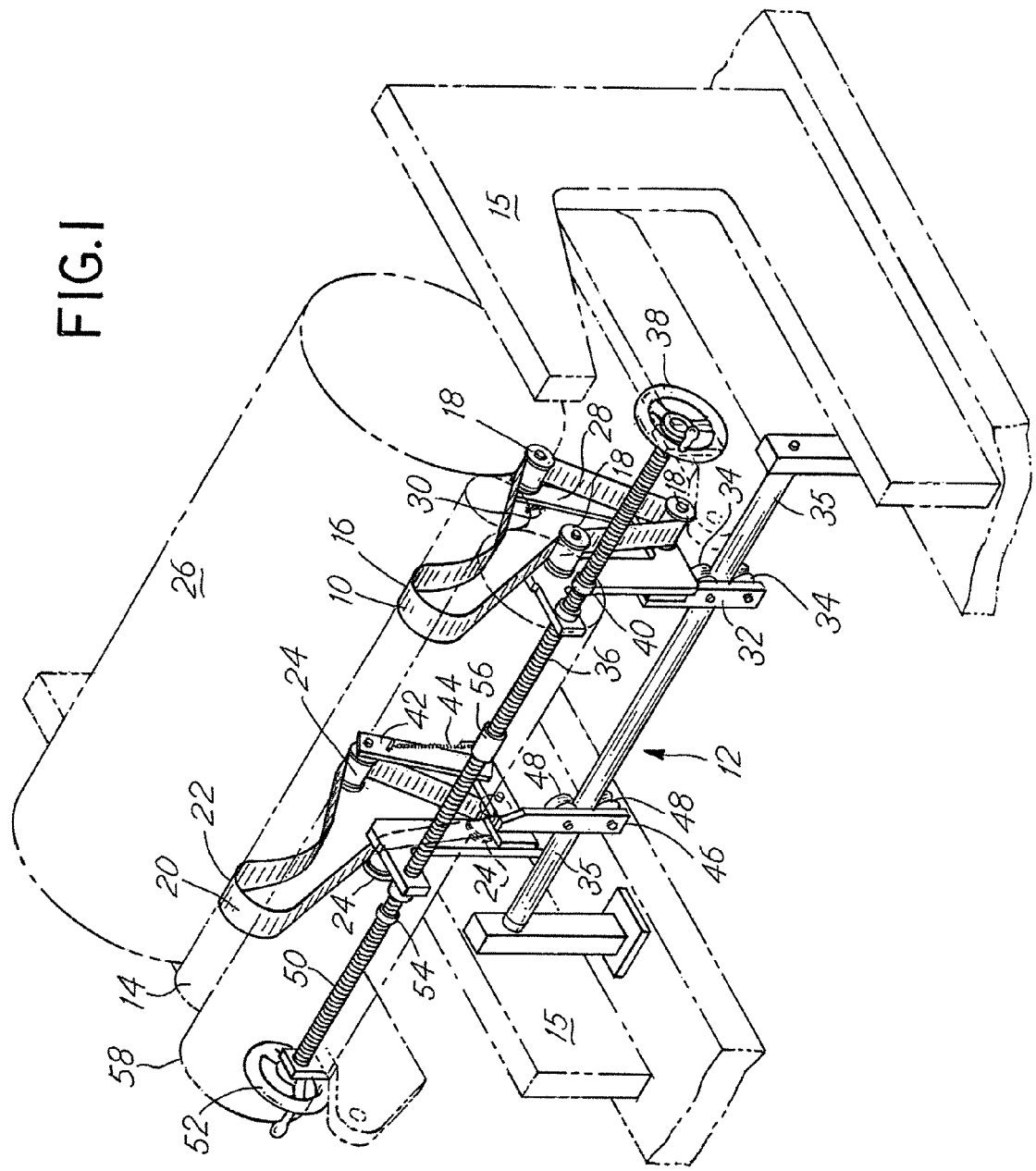
FIG. 1 illustrates a front perspective view of a belt system in accordance with an aspect disclosed herein.

The high release nip roll assembly disclosed herein can reduce or eliminate drawbacks of conventional approaches. The high release nip roll assembly disclosed herein can provide longer production runs (i.e., less downtime), and less material waste experienced using conventional approaches. For example, the high release nip roll assembly disclosed herein does not require downtime for taping and subsequently removing Teflon®/adhesive tape from nip rolls. The high release nip roll assembly disclosed herein can have greater durability and resiliency than Teflon®-sleeved rollers. The high release nip roll assembly disclosed herein can reduce the downtime needed to install pre-assembled Teflon®/cloth backing belts and can reduce the grooves created by Teflon®/cloth backing belts and associated problems therewith.

The high release nip roll assembly can comprise a high release belt and belt assembly. The belt can be a taped belt made using a combination of two tapes with the adhesive sides of each tape adhered to each other. The high release nip roll assembly described herein permits positioning adjustments of the taped belt without disassembling the belt or the nip roll assembly. In other words, the belt can be moved along the length of a nip roll, such that material which is wider or narrower than the prior sheet can be produced without disassembly of the belt or the nip roll assembly.

The belt can be made by taking two separate lengths of conventional Teflon®/adhesive tape and placing them into the nip area so that each adhesive side of each length of tape adheres to the other. The belt can be formed by joining the two ends of the formed Teflon®/adhesive-adhesive/Teflon® strip of material. Any seam between the two ends can disappear due to heating of those ends. In other words, the Teflon® tape belt can be formed by adhering two pieces of Teflon® tape to each other (sticky side to sticky side) in alignment without wrinkles or exposed edges. The end of each belt can have one side of the tape extended such that an overlap splice can be made to assemble the belt when installed on an extrusion lamination line. Since the extended tape edge can be the top piece of tape belt on one end and the bottom piece of the tape belt on the other end, the resulting overlap splice results in the entire tape belt being uniform in thickness. This prevents visual defects, premature wear and/or belt tracking issues.

In one aspect, a high release nip roll assembly comprises a belt comprising a high release material. An example of such a high release material is a fluoropolymer. Examples of a fluoropolymer include polytetrafluoroethylene (PTFE), fluorinated ethylene propylene (FEP), and perfluoroalkoxy (PFA) copolymer resin, all of which are sold under the trademark Teflon® by E. I. du Pont de Nemours and Company (DuPont), as well as ethylene-tetrafluoroethylene (ETFE), sold under the trademark Tefzel® by DuPont. A belt can be positioned at each end of a nip roll so that areas of the nip roll typically vulnerable to molten thermoplastic material contact can be protected by a belt.

In an aspect, a high release nip roll assembly can comprise a nip roll covering comprising a high release material. For example, the high release material can be a high release silicone. The nip roll material can be regrindable and exhibit resiliency similar to conventional roller coverings. The high release properties of the nip roll material can permit intermittent contact without the coating adhering to the surface of the roller and wrapping the nip.

In addition to the high release characteristic, the high release nip roll can be characterized as having low susceptibility of denting, high durability, high resiliency, and is regrindable. The high release nip roll can be characterized as having thermal conductivity, which is desirable to take away heat from the nip roll. This thermal conductivity characteristic provides a benefit over conventional rubber and rubberlike nip roll coverings, such as Neoprene, which is an insulator.

The assembly of the high release nip roll and the high release taped belt disclosed herein can provide a cost effective way of reducing nip wraps. Another advantage of the disclosed nip roll covering is the improved resiliency of the roller covering over conventional roller coverings. Due to this improved resiliency, the disclosed nip roll can be reground. In this respect, assembly disclosed herein can be more cost effective than Teflon®-sleeved rollers.

The high release belt and assembly can reduce or eliminate the downtime associated with taping and removing Teflon® tape from nip rolls, the replacing expensive custom made Teflon® belts and/or changing Teflon®-sleeved rollers to provide edge bead release.

FIG. 1 illustrates components of a high release belt 10 and belt assembly 12. The belt assembly 12 can be combined with a high release nip roll 14 of machine 15. Nip roll 14 can be covered with a dual durometer comprising a two-component thermally conductive high release silicone material. The thermally conductive layer can be next to the roller base. The shaft of the nip roll can be cooled, e.g., with chilled water, and the thermally conductive material can aid in cooling the roller. The top nip roll covering can be a high release silicone that is resilient and can be reground. Both of these characteristics can contribute to the release properties and cost effectiveness of the disclosed assembly. The high release nip roll covering by itself, however, may not be sufficient to obtain release of a variety of molten thermoplastic materials run at extrusion temperatures in excess of 580° F. for an extended period of time.

As shown in FIG. 1, when in a closed nip roll position, a first high release belt 10 is positioned at a first location 16 and around nip roll 14 and belt rollers 18. A second high release belt 20 is positioned at a second location 22 around nip roll 14 and belt rollers 24. When in a closed nip roll position, nip roll 14 is closer to the chilled roll 26 than when the nip roll 14 is in the open position. See FIG. 2.

Belt 10 can have a corresponding tensioner arm 28 having a spring 30. Tensioner arm 28 pulls at least one belt roller 18 in a direction away nip roll 14, thereby making belt 10 taunt. Tensioner arm 28 can be fastened to a moveable portion 32. Moveable portion 32 can be moved longitudinally with respect to nip roll 14 by support rollers 34, which roll along a fixed support bar 35. Movement of moveable portion 32 can be accomplished by turning threaded rod 36. Threaded rod 36 can be turned by turning flywheel 38. Stop 40 can be positioned on threaded rod 36 to stop the moveable portion 32 from going past a predetermined point.

Similarly, belt 20 can have a corresponding tensioner arm 42 having a spring 44. Tensioner arm 42 pulls at least one belt roller 24 in a direction away nip roll 14, thereby making belt 20 taunt. Tensioner arm 42 can be fastened to a moveable portion 46. Moveable portion 46 can be moved longitudinally with respect to nip roll 14 by support rollers 48, which roll along a fixed support bar 35. Movement of moveable portion 46 can be accomplished by turning threaded rod 50. Threaded rod 50 can be turned by turning flywheel 52. Stop 54 can be positioned on threaded rod 50 to stop the moveable portion 46 from going past a predetermined point.

As shown in FIG. 1, threaded rod 36 and threaded rod 50 can meet at connector 56. Back-up roller 58 is also shown in FIG. 1.

Figure 2:
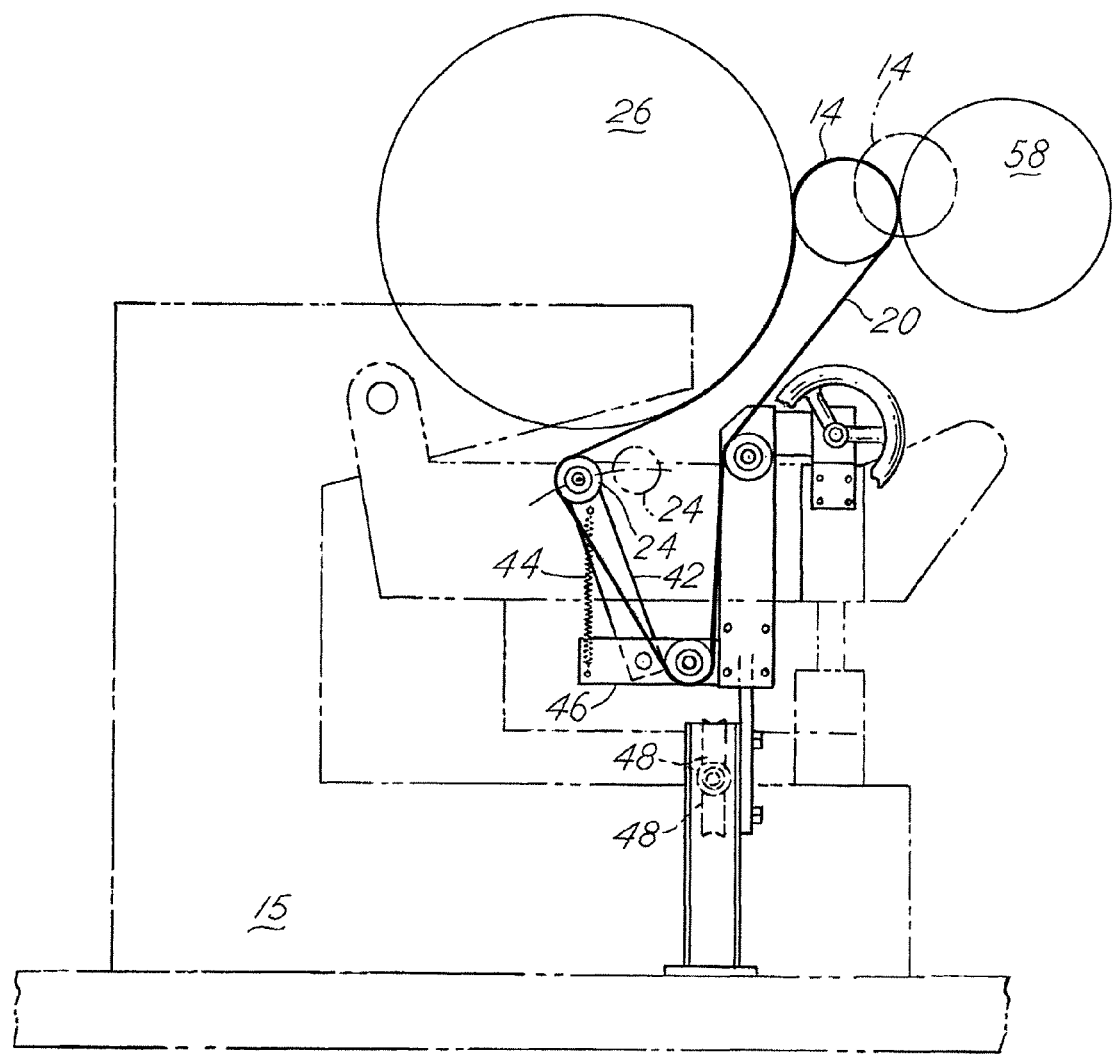
FIG. 2 illustrates a side view of the belt system shown in FIG. 1.

FIG. 2 illustrates a right hand side view of the belt system shown in FIG. 1.

Figure 3:
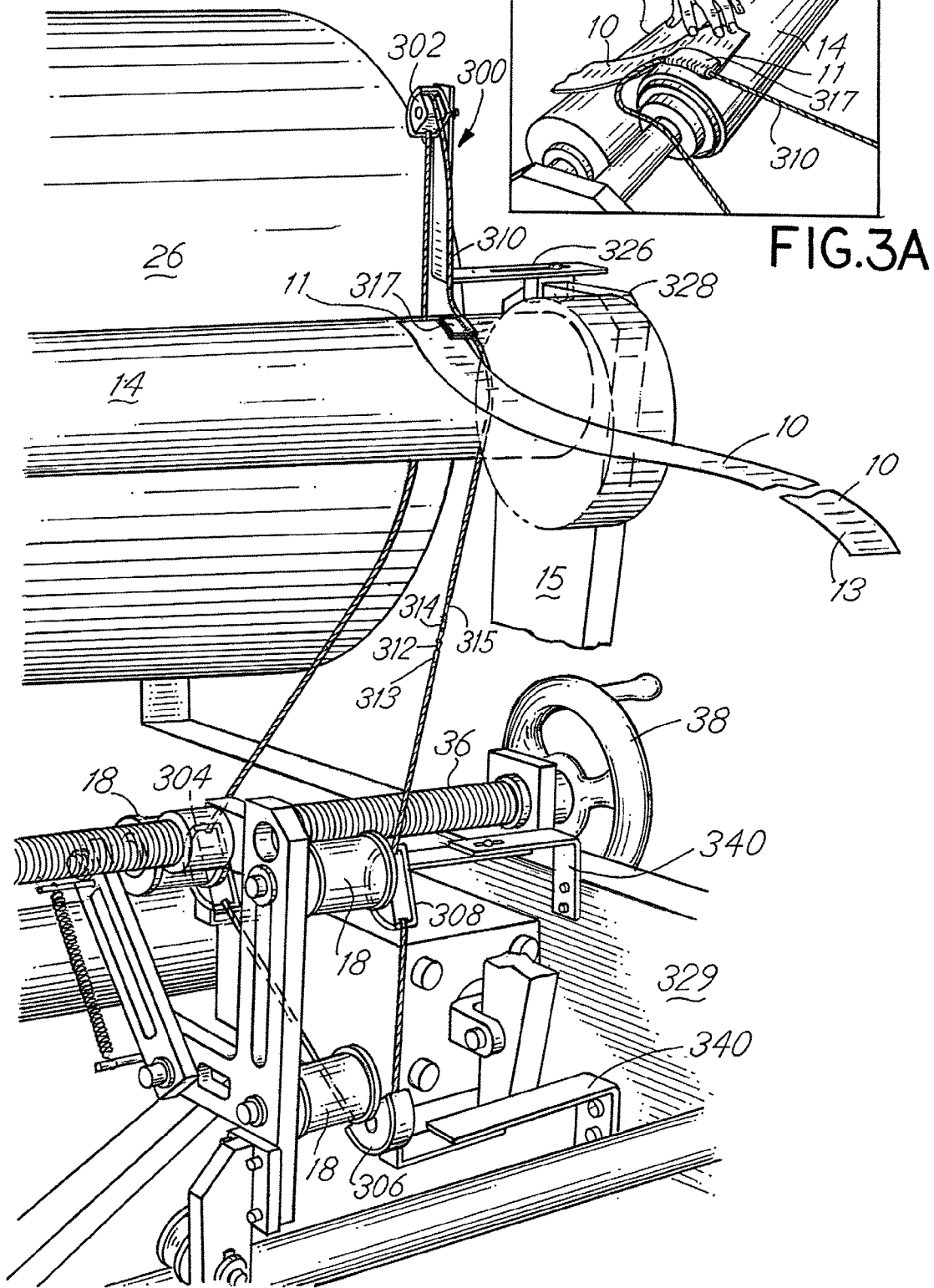
FIG. 3 illustrates a rope guide system prior to threading a belt in relation to a machine that comprises a nip roll in accordance with an aspect disclosed herein.

FIG. 3 illustrates a rope guide system 300 prior to threading a belt 10 in relation to a machine 15 that comprises a nip roll 14 in accordance with an aspect disclosed herein. Rope guide system 300 comprises rope guides 302, 304, 306 and 308. Rope 310 can be pulled along the rope guides in a predetermined path. Rope 310 can have a hook 312 and a fastening clasp 313 at one end, and a hook 314 and a fastening clasp 315 at the other end. When not needed for threading purposes, the rope 310 can be moved away from moving parts or parts of machine 15 that will be moving during various operations of machine 15. When desired hook 312 and hook 314 can be detached from each other by unclasping clasp 313 and/or clasp 315.

As shown in FIG. 3 and FIG. 3A, rope 310 can be affixed to belt 10, such as by taping rope 310 to a leading section 11 of belt 10. As shown in FIG. 3A, the taping of rope 310 to the leading section 11 of belt 10 can be done using tape 317 that is folded over the rope and itself. Tape 317 can be a tape having an adhesive on both sides of tape 317 at locations that allow rope 310 to be affixed to leading section 11, yet do not interfere with threading of leading section 11 through machine 15. After affixing rope 310 to leading section 11, such as by a tape 317, rope 310 can be pulled around the rope guides, and as it is pulled around the rope guides, rope 310 will pull leading section 11 around belt rollers 18.

Figure 4:
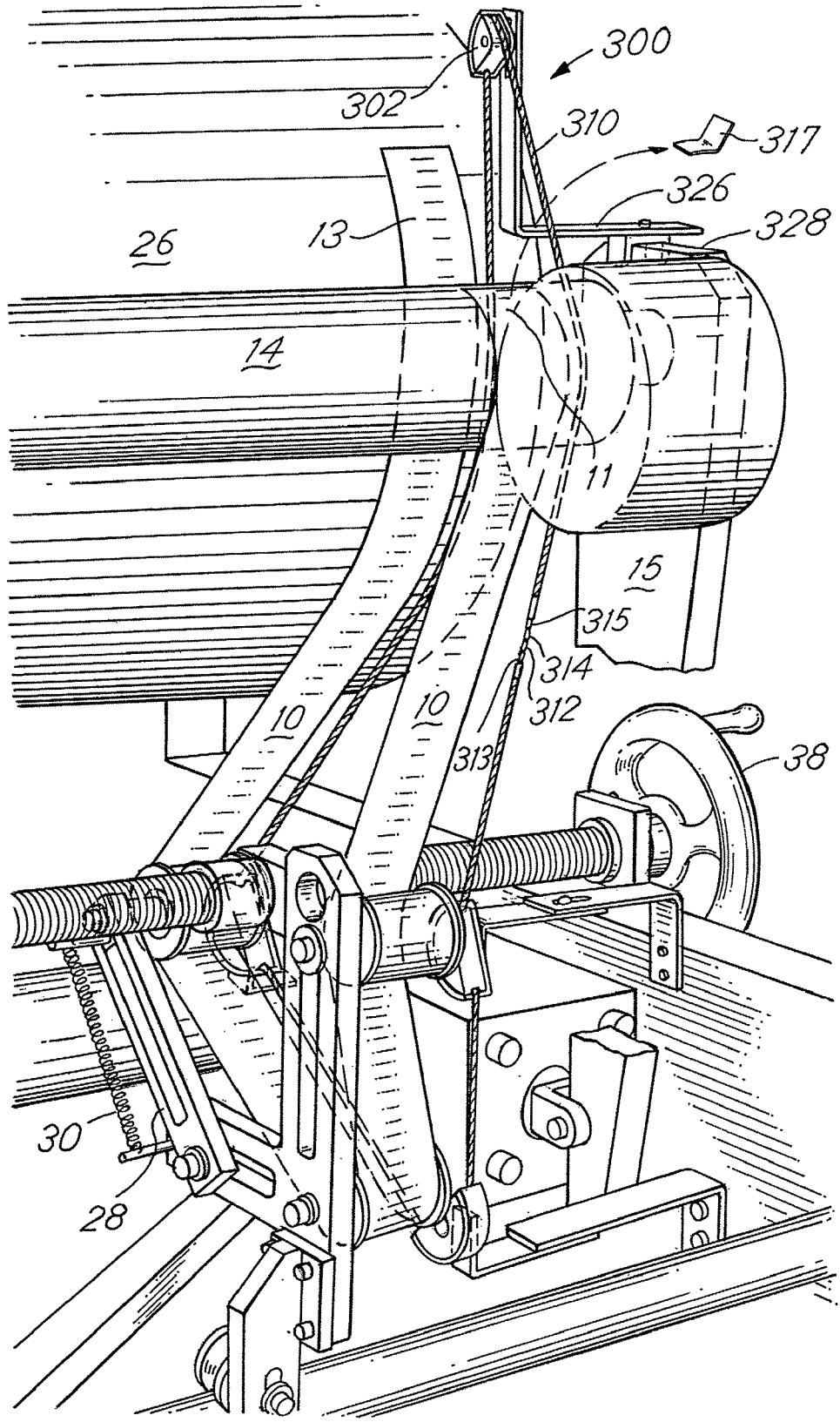
FIG. 4 illustrates a rope guide system after threading a belt in relation to a machine that comprises a nip roll in accordance with an aspect disclosed herein.

FIG. 4 illustrates rope guide system 300 after threading belt 10 in relation to the machine that comprises nip roll 14. Rope 310 can now be detached from leading section 11 of belt 10. For example if the rope 310 is attached to belt 10 by tape 317 that is folded over the rope and itself (see FIG. 3A) prior to threading of belt 10 in relation to the machine, the attaching tape 317 can be removed from the belt after threading belt 10 in relation to the machine 15 that comprises the nip roll 14. Trailing section 13 of belt 10 can be held in place by hand or taped to chilled roll 26 until it is time to adhere an exposed adhesive portion of a top layer of trailing section 13 to an exposed adhesive portion of a bottom layer of leading section 11 as further described below.

FIGS. 5A and 5B illustrate an embodiment of a rope guide 302 in accordance with an aspect disclosed herein. Rope guide 302 comprises two quarter circle shapes 316 and 318, which define a channel 320. Shapes 316 and 318 can be attached via screw 322 and nut 324. Rope guide 302 can be affixed to bracket 326 as shown in FIGS. 3 and 4. Bracket 326 can be fastened to any fixed portion, such as portion 328, of the machine 15 comprising nip roll 14.

FIGS. 6A and 6B illustrate a second embodiment of a rope guide 304 in accordance with an aspect disclosed herein. Rope guides 306 and 308 can have a similar structure as either rope guide 304 or rope guide 302. In the embodiment shown in FIG. 3, rope guides 306 and 308 have the same shape as rope guide 304. Each of these rope guides 304, 306 and 308 can comprise two half circle shapes 330 and 332, which define channel 334. Shapes 330 and 332 can be attached via screw 336 and nut 338. Each of these rope guides 304, 306 and 308 can be affixed to a corresponding bracket, such as brackets 340 shown in FIG. 3 for rope guides 306 and 308. Brackets 340 can be affixed to any fixed portion, such as portion 329, of the machine 15 comprising nip roll 14. While a bracket for rope guide 304 is not shown in FIG. 3, rope guide 304 can be attached to portion 329 by a bracket, such as bracket 340 as those shown for rope guides 306 and 308.

FIG. 7 illustrates a perspective view of jig 700 in accordance with an aspect disclosed herein. Jig 700 comprises a curved arc top surface 702, the curved arc top surface 702 defining a channel 704 between ridges 711 and having a predetermined belt width 706. A leading section belt clip 708 can be provided on one side of the curved arc top surface, and a trailing section belt clip 710 on the other side of the curved arc top surface 702. The leading section of a belt can be clipped to the jig 700 by the leading section belt clip 708, and laid within the channel 704. The trailing section of the belt can be clipped to the jig 700 by the trailing section belt clip 710. At jig 700, an adhesive side of a bottom tape of the leading section of the belt can be exposed, and an adhesive side of the top tape of the trailing section of the belt can be exposed to, aligned with, and adhered to the adhesive side of the bottom tape of the leading section of the belt. Jig 700 can have an alignment piece 712 to place the jig 700 at a predetermined distance from the end of a nip roll. Alignment piece 712 can be adjusted and then fixed in place by screws 714 (see FIGS. 8 and 9).

FIG. 8 illustrates a top view of the jig 700 shown in FIG. 7.
FIG. 9 illustrates a bottom view of the jig 700 shown in FIG. 7.

FIGS. 10A, 10B, 11A and 11B illustrate the apparatus and process of completing the belt loop using the jig shown in FIG. 7.

Figure 10A:
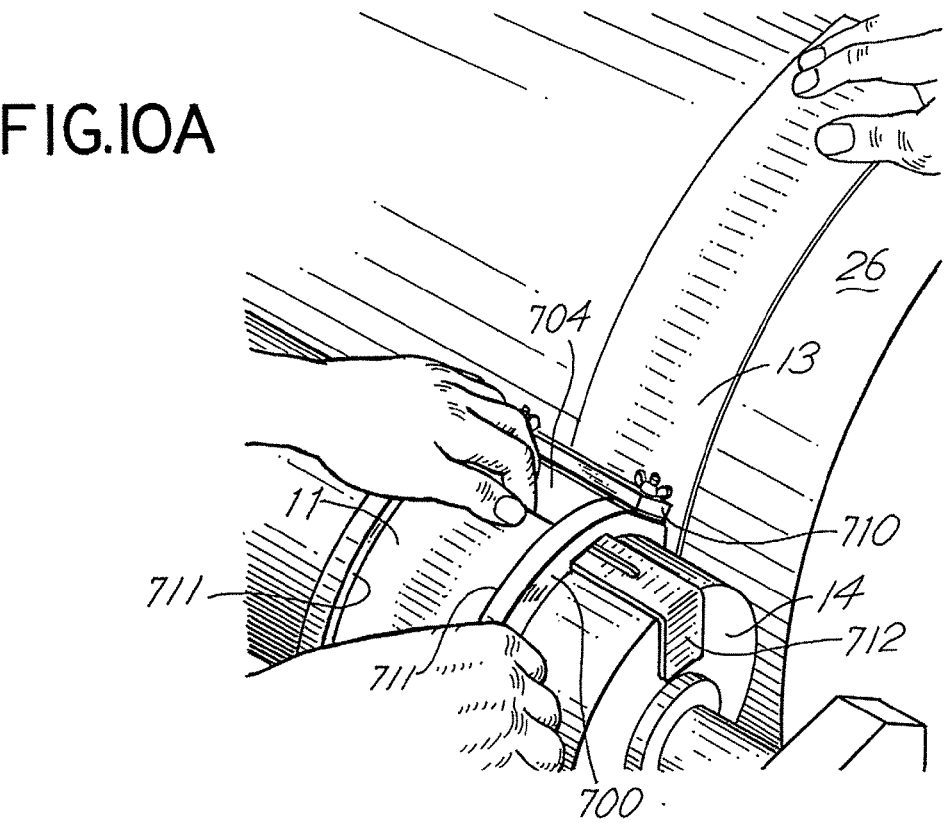
FIGS. 10A, 10B, 11A and 11B illustrate the apparatus and process of completing the belt loop using the jig shown in FIG. 7.

FIG. 10A illustrates the jig 700 shown in FIG. 7 after being placed on top of a nip roll 14, and after leading section 11 of belt 10 has been threaded around belt rollers to the point where it can now be laid into channel 704 of jig 700, and clipped to jig 700 by leading section clip 708 (not shown) of jig 700. Trailing section 13 of belt 10 can be held in a manner so that it does not fall into machine 15, such as holding it by hand against chilled roll 26 as shown in FIG. 10A, or taping it to chilled roll 26.

Figure 10B:
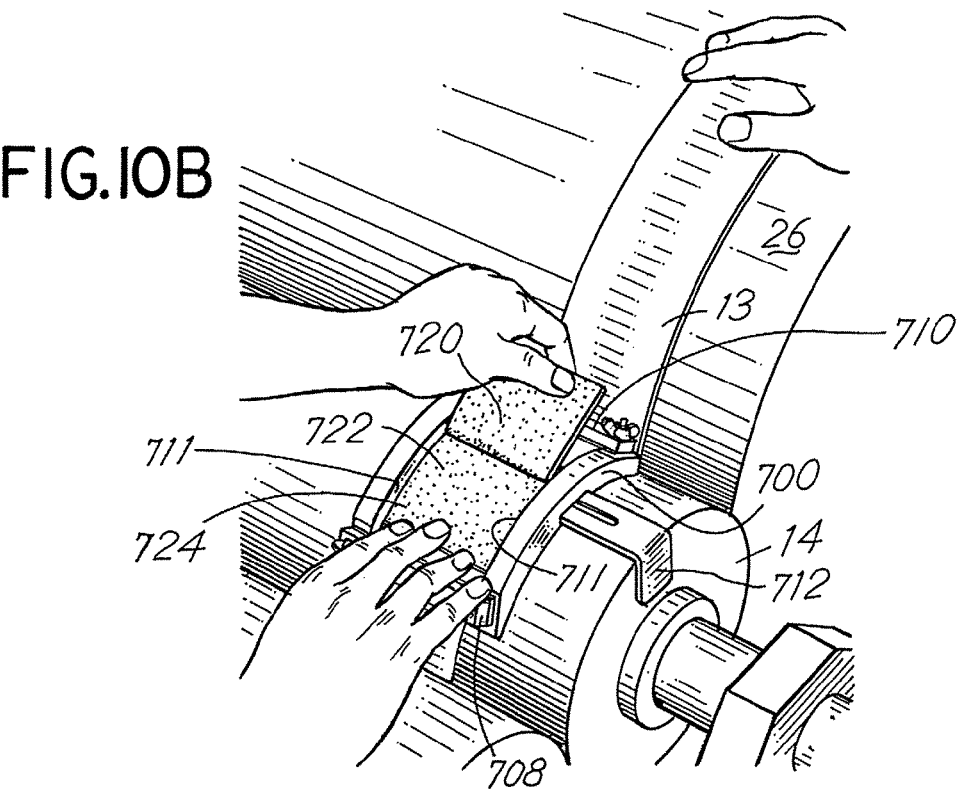

As shown in FIG. 10B, leading section 11 has now been laid into channel 704 and between ridges 711 of jig 700 about 50% to 80% along the arc surface of jig 700, and clipped to jig 700 by leading section clip 708. As further shown in FIG. 10B, a removable tape 720 can be pulled off of the leading section 11 to expose an adhesive side 722 of a bottom tape 724 that comprises belt 10.

Figure 11A:
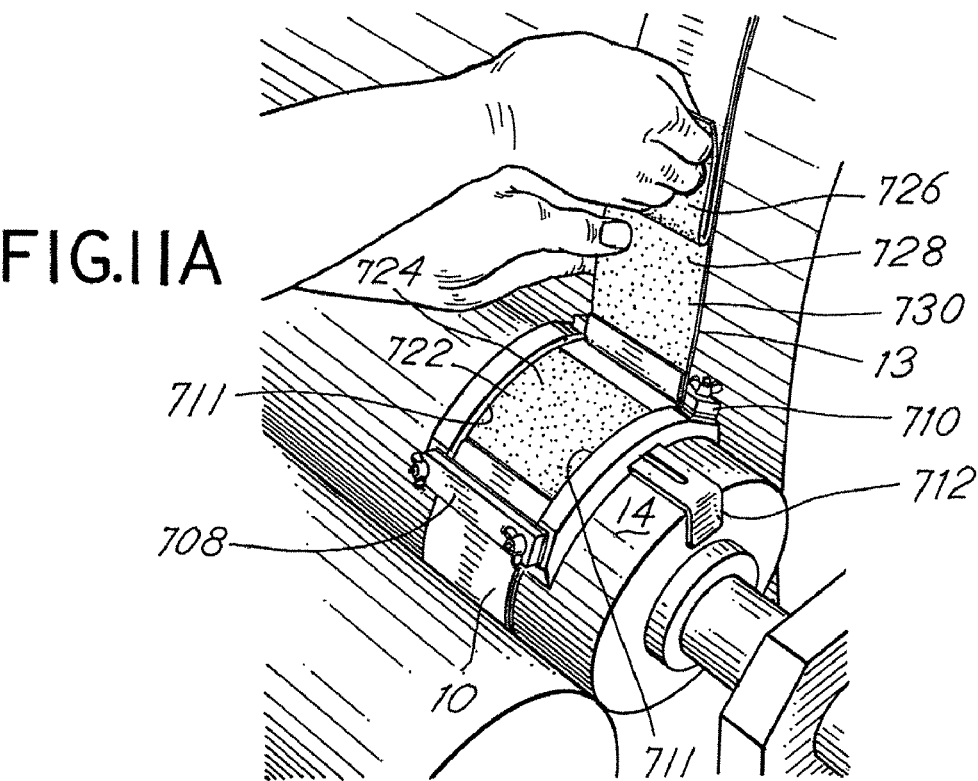

Trailing section 13 can be clipped to jig 700 by trailing section clip 710. As shown in FIG. 11A, a removable tape 726 can be pulled off of trailing section 13 to expose an adhesive side 728 of a top tape 730 that comprises belt 10 in combination with bottom tape 724.

Figure 11B:
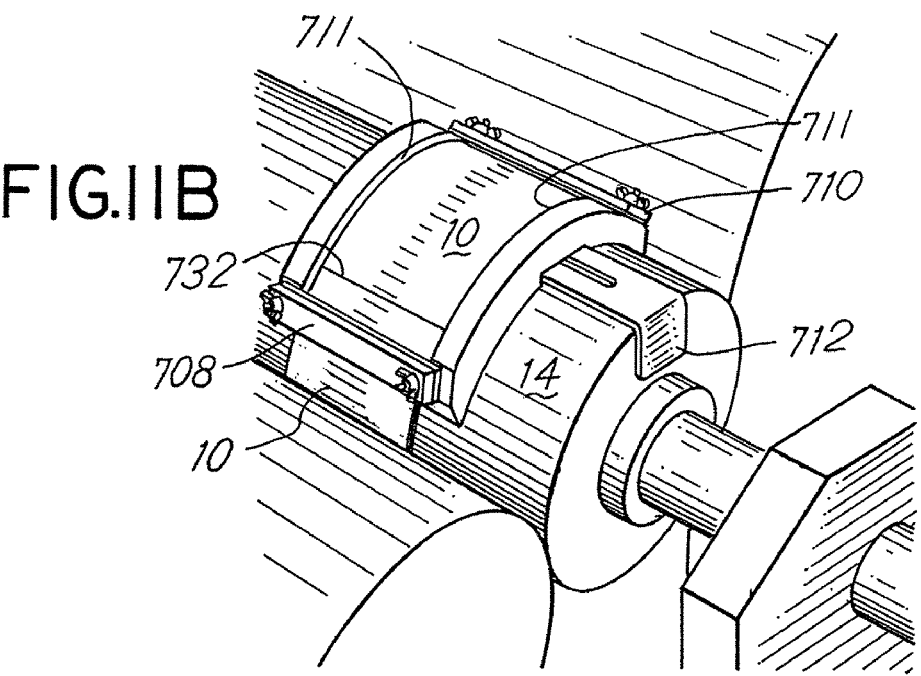

Adhesive side 728 of top tape 730 can then be laid over and adhered to adhesive side 722 of bottom tape 724 to complete the loop of belt 10 as shown in FIG. 11B. In a preferred embodiment, the portion of the exposed adhesive side 722 of the bottom tape 724 and the portion of the exposed adhesive side 728 of the top tape 730 are equal in size. Seem 732 can disappear or become vulcanized as the belt 10 becomes warmed during operation of machine 15. The clips 708 and 710 can be loosened and jig 700 removed from the top of nip roll 14. A tensioner arm and spring, like that previously described, can pull a belt roller away from the nip roll 14, thereby making the belt 10 taunt.

To obtain high release from a nip roll covering for an extended period of time a Teflon® taped belt subassembly can be used.

Figure 12:
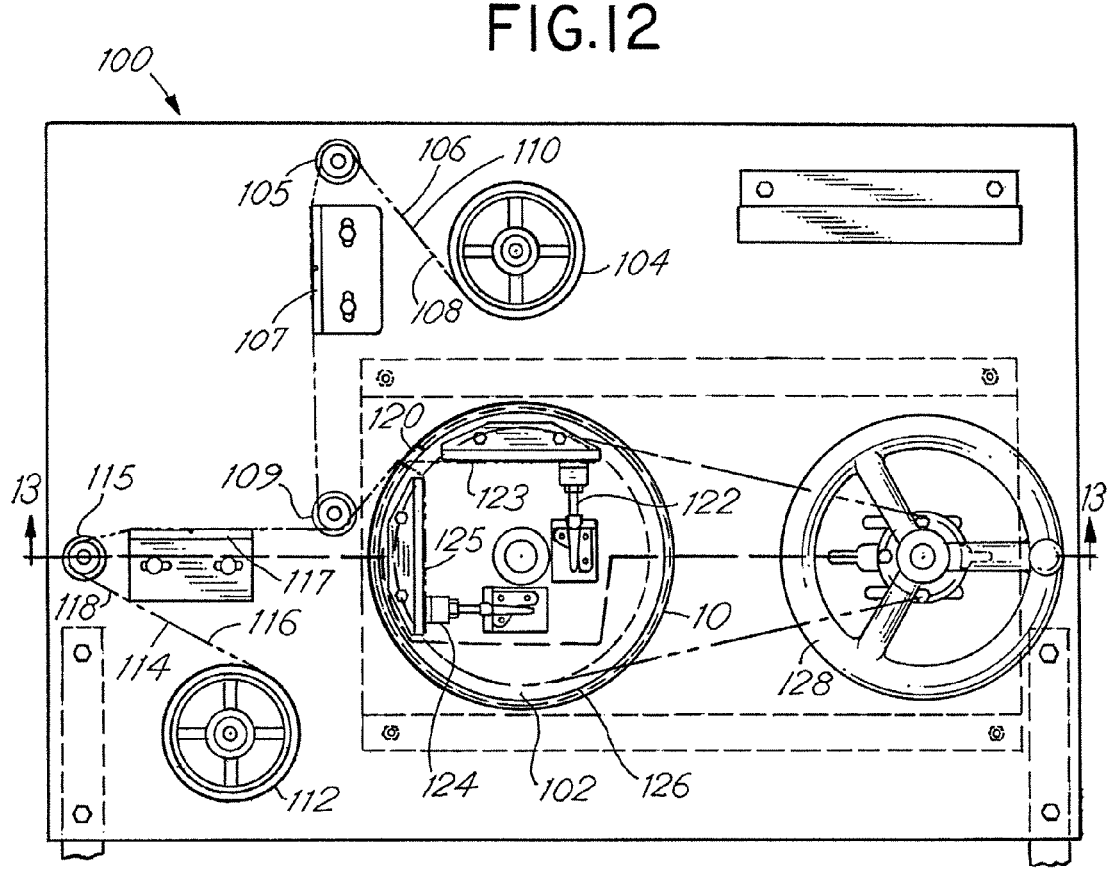
FIG. 12 illustrates a belt maker apparatus in accordance with an aspect disclosed herein.
Figure 13:
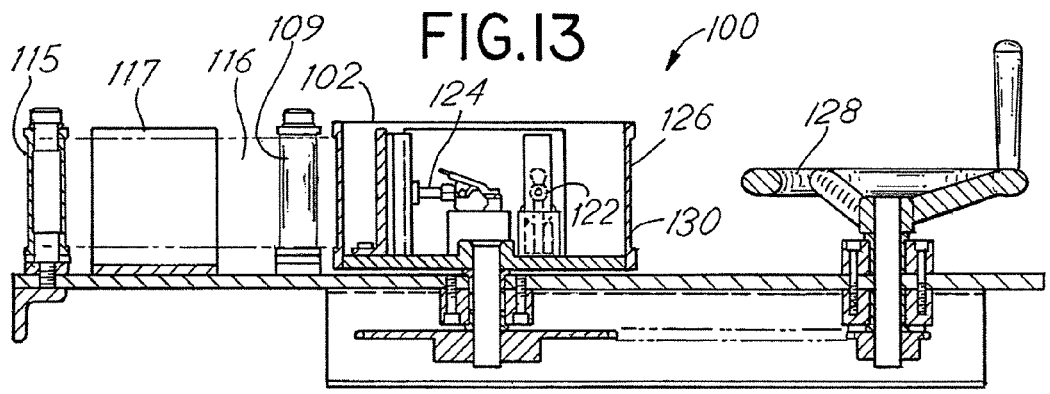
FIG. 13 illustrates a section view of the belt maker apparatus shown in FIG. 12 along line 13-13.

As illustrated in FIGS. 12 and 13, two spools of commercially available Teflon® tape can be loaded on to a belt making apparatus. This apparatus shown in FIGS. 12 and 13 can be used to adhere two tapes to each other (adhesive side to adhesive side), thereby producing a single strip with the two tapes properly aligned and without wrinkles or any surface imperfections. A continuous Teflon® tape belt can be made on-line by adhering the two ends of the single strip of belt to each other. Conventional Teflon® belts are made continuous with a seam at the location where they were joined, typically are cloth-backed, and cannot be assembled on-line. Machine disassembly is required to install conventional belts, thereby increasing downtime.

FIG. 12 illustrates a high release belt maker apparatus 100 in accordance with an aspect disclosed herein. High release belt maker apparatus 100 comprises a wind-up drum 102, a first or top tape roll 104 comprising a first or top tape 106 having a high release side 108 and an adhesive side 110, and a second or bottom tape roll 112 comprising a second or bottom tape 114 having a high release side 116 and an adhesive side 118. The wind-up drum 102 can define a slot 120. The wind-up drum 102 can comprise a first clamp 122 and a second clamp 124 inside the wind-up drum 102. First tape 106 from the first tape roll 104 can be fed along roller 105, plate 107 and roller 109 into the slot 120 and clamped by the first clamp 122 at first clamp plate 123. Second tape 114 from the second tape roll 112 can be fed along roller 115 and plate 117 into the slot 120 and clamped by the second clamp 124 at second clamp plate 125. The wind-up drum 102 can be rotated and the adhesive side 110 of the first tape 106 can adhere to the adhesive side 118 of the second tape 114 as the first tape 106 and second tape 114 are wound around the outside 126 of the wind-up drum 102 to produce a high release belt 10 having a high release surface on each side of the belt 10. Wind-up drum 102 can be rotated by rotating a flywheel 128. When desired, first tape 106 can be cut across its width along a cutting slot defined by plate 107. When desired, second tape 114 can be cut across its width along a cutting slot defined by plate 117.

FIG. 13 illustrates a section view of the high release belt maker apparatus shown in FIG. 12 along line 13-13. As shown in FIG. 13, wind-up drum 102 can define a channel 130. Channel 130 can be used to align the side edges of first tape 106 and second tape 114.

Belt 10 can be unwound from wind-up drum 102 by turning flywheel 128 in the opposite direction from when the wind-up drum was winding the tapes 106 and 114, resulting in a strip of belt.

The clamped portions of the first tape 106 and the second tape 114 can be unclamped and then joined together or cut off from the belt.

The strip of belt can include a leading section 11 wherein the first tape 106 has a removable portion (such as scored portion and/or a removable tape 720 as previously described) that can be removed from a corresponding portion of the second tape 114 to expose the adhesive side of the corresponding portion of the second tape 114. The belt 10 can include a trailing section 13 wherein the second tape 114 has a removable portion (such as a scored portion and/or a removable tape 726 as previously described) that can be removed from a corresponding portion of the first tape 106, to expose the adhesive side of the corresponding portion of the first tape 106. The portion of the exposed adhesive side of the first tape 106 can be adhered to the portion of the exposed adhesive side of the second tape 114, thereby forming a closed belt, such as in the manner previously described and shown in FIGS. 10A, 10B, 11A, and 11B in connection with the splicing together of the trailing section of top tape 730 and the leading section of the bottom tape 724. In other words, first or top tape 106 in FIG. 12 can correspond to top tape 730 in FIGS. 10A, 10B, 11A, and 11B, and second or bottom tape 114 in FIG. 12 can correspond to bottom tape 724 in FIGS. 10A, 10B, 11A, and 11B. In a preferred embodiment, the portion of the exposed adhesive side of the second tape 114 and the portion of the exposed adhesive side of the first tape 106 are equal in size.

Once the belt comprising a high release material is formed, such as by using an apparatus as shown in FIGS. 12 and 13, the belt can be guided by rollers as shown in FIGS. 1 and 2 and can be under tension to reduce or prevent slack. A positioning adjustment apparatus as shown in FIG. 1 can allow for movement of the belt either in or out along the length of the nip roll to properly align the belt at a location where the nip roll would be vulnerable to molten thermoplastic material without the presence of the belt. The belt can be continually moving to reduce exposure to high heat, thereby resulting in increased durability versus the conventional approach of applying a single strip of conventional tape directly to the nip roll, i.e., the adhesive side of the conventional tape applied directly to the nip roll. The use of the high release nip roll covering can allow for any intermittent contact of the melt curtain to immediately release from the roller surface and allow for belt position changes to be made while the machine is running.

It has been observed that a conventional nip roll assembly using a Teflon®/adhesive tape applied directly to a Neoprene coated nip roll requires the need to replace the Teflon®/adhesive tape about every 1 million feet of coated sheet. It has been observed that in this conventional nip roll assembly, the Neoprene coated nip roll assembly experienced about 1 nip wrap/day, with 2 nip rolls needing to be replaced within one week. It has been observed that in this conventional nip roll assembly, a nip wrap takes about 30 minutes to fix until the production can begin again. Adjustments or changes for the width of sheet being made using this conventional system require the line to be shut down, at least one Teflon®/adhesive tape to be pulled off of the nip roll, and a Teflon®/adhesive tape to be placed on the nip roll at the new, desired location.

It was observed that using a high release silicone coating on the nip roll as described above (while using a high release Teflon®/adhesive-adhesive/Teflon® belt as disclosed above in combination) resulted in the manufacture of about 8.5 million feet of coated sheet before belt replacement was necessary. It was also observed that the high release silicone coated nip roll assembly experienced about 1 nip wrap/week, with 2 nip rolls needing to be replaced within 7 weeks. It has been observed that in this nip roll assembly embodiment of the present invention, a nip wrap takes about 5 minutes to fix until the production can begin again. It has been observed that in this nip roll assembly embodiment of the present invention, the severity of a nip wrap is much less than a nip wrap experienced in a conventional nip assembly described in the preceding paragraph. Further, adjustments or changes for the width of sheet being made can be made much quicker in this embodiment of the present invention than in the conventional system described in the preceding paragraph because a belt (such as belt 10 or belt 20 shown in FIG. 1) can be moved along the longitudinal length of nip roll 14 by simply turning a flywheel (such as flywheel 38 or 52 shown in FIG. 1).

It was observed that using a conventional Neoprene coated nip roll (in combination with the high release Teflon®/adhesive-adhesive/Teflon® belt as disclosed above) resulted in the manufacture of about 4.7 million feet of coated sheet before belt replacement was necessary. It was observed that the Neoprene coated nip roll assembly experienced about 1 nip wrap/day, with 2 nip rolls needing to be replaced within 1 week. It has been observed that in this nip roll assembly, a nip wrap takes about 30 minutes to fix until the production can begin again.

It will be apparent to persons skilled in the art that various modifications and alterations to the preferred embodiments mentioned above may be made without departing from the underlying concept of the inventions. All such modifications and alterations are included within the scope of the present invention.

What is claimed is:

1. An apparatus comprising a nip roll having a high release material cover and a high release belt comprising a first tape and a second tape, each tape having a high release side and an adhesive side, wherein the adhesive side of each tape is joined to the adhesive side of the other tape, with the side edges of the tapes aligned so that top and bottom surfaces of the belt comprise the high release side of each tape, the belt comprising a leading section wherein a portion of the first tape has been removed at the leading section, thereby exposing a portion of the adhesive side of the second tape at the leading section, the belt comprising a trailing section wherein a portion of the second tape has been removed at the trailing section, thereby exposing a portion of the adhesive side of the first tape at the trailing section, wherein the portion of the exposed adhesive side of the first tape at the trailing section is adhered to the portion of the exposed adhesive side of the second tape at the leading section to form a closed belt and wherein a portion of the belt is positioned on the nip roll to protect the nip roll at a location that otherwise would be vulnerable to molten thermoplastic material.

2. The apparatus of claim 1, wherein the high release side of each tape comprises a fluoropolymer.

3. The apparatus of claim 1, wherein the high release cover of the nip roll comprises silicone.

4. The apparatus of claim 1 further comprising at least one belt roller, the belt roller having an axis and a support frame having a fixed portion and a moveable portion, the fixed portion comprising a fixed support bar having a section that is parallel to the axis of the belt roller and upon which the moveable portion moves along, the belt roller attached to the moveable portion of the support frame.

5. The apparatus of claim 4, wherein the support frame comprises a threaded rod, wherein the moveable portion of the support frame moves along the threaded rod as the threaded rod is rotated, thereby moving the at least one belt roller in the same direction as the moveable portion of the support frame.

6. The apparatus of claim 5, wherein the threaded rod is rotated by rotating a first flywheel.

7. The apparatus of claim 4 further comprising a second belt roller, the second belt roller having an axis and a second belt roller support frame having a fixed portion and a moveable portion, the fixed portion of the second belt roller support frame comprising a corresponding fixed support bar having a section that is parallel to the axis of the second belt roller and upon which the moveable portion of the second belt roller moves_along, the second belt roller attached to the moveable portion of the second belt roller support frame.

8. The apparatus of claim 7, wherein the second belt roller support frame comprises a corresponding threaded rod, wherein the moveable portion of the second belt roller support frame moves along the corresponding threaded rod as the corresponding threaded rod is rotated, thereby moving the second belt roller in the same direction as the moveable portion of the second belt roller support frame.

9. The apparatus of claim 8, wherein the corresponding threaded rod of the second belt roller support frame is rotated by rotating a second flywheel.

10. The apparatus of claim 5 or claim 8, wherein the threaded rod is connected to a first end of a connector and the corresponding threaded rod is connected to a second end of the connector.

11. The apparatus of claim 4 further comprising at least one stop that stops the movement of the moveable portion of the support frame corresponding to the at least one belt roller at a predetermined distance along the fixed support bar.

12. The apparatus of claim 7 further comprising at least one stop that stops the movement of the moveable portion of the second belt roller support frame along the corresponding fixed support bar.

13. The apparatus of claim 4 further comprising a rope guide system having a closed loop of rope and at least one rope guide for guiding the rope in a path in relation to the nip roll and the at least one belt roller, wherein the rope is attached to the leading section of the belt, wherein the rope is pulled around the at least one rope guide so that the rope pulls the belt in a predetermined path around the at least one belt roller, the rope being detachable from the leading section of the belt after sufficiently threading the leading section of the belt in relation to the nip roll and the at least one belt roller, and the leading section of the belt is joined to the trailing section of the belt.

14. The apparatus of claim 13 further comprising at least two rope guides.

* * * * *